US010308831B2

(12) United States Patent
Ishikawa et al.

(10) Patent No.: US 10,308,831 B2
(45) Date of Patent: Jun. 4, 2019

(54) PHOTOCURABLE COMPOSITION

(71) Applicant: DEXERIALS CORPORATION, Tokyo (JP)

(72) Inventors: Kentaro Ishikawa, Sano (JP); Satoshi Yanagida, Saitama (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 14/437,032

(22) PCT Filed: Nov. 7, 2013

(86) PCT No.: PCT/JP2013/080128
§ 371 (c)(1),
(2) Date: Apr. 20, 2015

(87) PCT Pub. No.: WO2014/080769
PCT Pub. Date: May 30, 2014

(65) Prior Publication Data

US 2015/0252207 A1 Sep. 10, 2015

(30) Foreign Application Priority Data

Nov. 23, 2012 (JP) ................................ 2012-256975

(51) Int. Cl.
*B32B 27/30* (2006.01)
*B32B 27/16* (2006.01)
(Continued)

(52) U.S. Cl.
CPC ............ *C09D 133/08* (2013.01); *B32B 27/16* (2013.01); *B32B 27/30* (2013.01); *C08F 222/10* (2013.01);
(Continued)

(58) Field of Classification Search
CPC ................ C09D 147/00; C09D 133/08; C09D 133/066; C09D 4/00; C09D 135/02;
(Continued)

(56) References Cited

U.S. PATENT DOCUMENTS 3,935,173 A * 1/1976 Ogasawara ............ C08F 20/20 522/104
4,080,318 A * 3/1978 Smith ................ C08G 18/4277 525/418
2011/0230582 A1* 9/2011 Kito ..................... C09D 11/101 522/39

FOREIGN PATENT DOCUMENTS

JP 2004-005005 A 1/2004
JP 2005023194 A * 1/2005
(Continued)

OTHER PUBLICATIONS

Machine translation of JP 2005023194 A.*
(Continued)

*Primary Examiner* — Kregg T Brooks
(74) *Attorney, Agent, or Firm* — Oliff PLC

(57) ABSTRACT

A protective coat layer-forming composition is used for forming a protective coat layer of a protective coat layer-laminated film including a base film made of a cyclic olefin resin and the protective coat layer formed on at least one side of the base film. The protective coat layer-forming composition includes a component (A) of a multifunctional acrylate monomer, a component (C) of an isocyanuric acid derivative having two or more (meth)acryloxy groups, a component (D) of a caprolactone oligomer derivative having three or more (meth)acryloxy groups, and a component (E) of a photopolymerization initiator.

7 Claims, 3 Drawing Sheets

2
1
3
2

(51) Int. Cl.

| | |
|---|---|
| ***C08F 222/10*** | (2006.01) |
| ***C08F 220/28*** | (2006.01) |
| ***C08F 290/06*** | (2006.01) |
| ***C08F 290/14*** | (2006.01) |
| ***C09D 133/08*** | (2006.01) |
| ***C09D 133/06*** | (2006.01) |
| ***C09D 135/02*** | (2006.01) |
| ***C09D 4/00*** | (2006.01) |
| ***C09D 4/02*** | (2006.01) |
| ***C09D 5/00*** | (2006.01) |
| ***G06F 3/041*** | (2006.01) |
| ***C09D 147/00*** | (2006.01) |

(52) U.S. Cl.
CPC .... *C08F 222/1006* (2013.01); *C08F 290/061* (2013.01); *C09D 4/00* (2013.01); *C09D 133/066* (2013.01); *C09D 135/02* (2013.01); *C09D 147/00* (2013.01); *Y10T 428/266* (2015.01); *Y10T 428/31928* (2015.04)

(58) Field of Classification Search
CPC ............ C08F 222/1006; C08F 290/061; C08F 290/067; C08F 222/10; C08L 47/00; C08G 290/061; C08G 290/067; B32B 27/16; B32B 27/30
See application file for complete search history.

(56) References Cited

FOREIGN PATENT DOCUMENTS

| | | | |
|---|---|---|---|
| JP | 2008-173856 | A | 7/2008 |
| JP | 2009-230800 | A | 10/2009 |
| JP | 2010-59229 | A | 3/2010 |
| JP | 2011-093957 | A | 5/2011 |
| JP | 2011-173982 | A | 9/2011 |
| JP | 2012-066477 | A | 4/2012 |
| TW | 201011050 | A | 3/2010 |
| TW | 201127627 | A | 8/2011 |

OTHER PUBLICATIONS

Allnex, Ebecryl 230 Data Sheet (2013).*
Machine translation of JP 2010-059229 A.*
Feb. 10, 2014 International Search Report issued in International Patent Application No. PCT/JP2013/080128.
Dec. 30, 2016 Office Action issued in Taiwanese Application No. 102141391.
Product information of Tomoe Engineering Co., Ltd., relating to chemical products [searched on Oct. 5, 2017], via the Internet <http://www.tomo-e.co.jp/j/product/chem/index.html>.
Dec. 19, 2017 Office Action issued in Japanese Patent No. 6115100.
Aug. 6, 2018 Office Action issued in Taiwanese Application No. 106137936.

* cited by examiner

PHOTOCURABLE COMPOSITION

TECHNICAL FIELD

The present invention relates to a photocurable composition particularly suitable for forming a protective coat layer of a protective coat layer-laminated film including a base film made of a cyclic olefin resin and the protective coat layer formed on at least one side of the base film.

BACKGROUND ART

Hard coat layer-laminated films have been conventionally used as one example of materials for a base film of an electrode film for a touch panel. In such hard coat layer-laminated film, a hard coat layer, such as a polyurethane acrylate photocured product layer, is provided on a transparent base film, such as polymethacrylate film or polyester film. The polymethacrylate film and polyester film, however, have characteristics of high hygroscopicity and being easily thermally deformed. Thus, cyclic olefin resin films having high transparency, low hygroscopicity, and stable refractive index have been recently proposed for use as a base film for hard coat layer-laminated films (Patent Literature 1).

CITATION LIST

Patent Literature

Patent Literature 1: Japanese Patent Application Laid-Open No. 2012-66477

SUMMARY OF INVENTION

Technical Problems

By the way, cyclic olefin resin films are preferable in terms of the characteristics of transparency, hygroscopicity, and the like, but disadvantageous in insufficient flexibility and relatively low surface hardness, which causes problems of low abrasion resistance and being easily scratched. Accordingly, these cyclic olefin resin films have been provided with a hard coat layer similar to those used in conventional films. Hard coat layer-laminated films including a cyclic olefin resin film as a base film, however, had a problem of crack occurrence not only in the hard coat layer but also on the surface of the cyclic olefin resin film when the hard coat layer-laminated films are subjected to a bend test. Such hard coat layer-laminated films have further required the followings: having a low curling property; having the range of fracture elongation achieving a favorable balance between stress relaxation and dimensional stability; and further achieving excellent adhesion between the hard coat layer and the cyclic olefin resin film.

An object of the present invention is to solve the above-mentioned problems of conventional techniques, and is to avoid practically problematic cracks in a coat layer-laminated film having a coat layer laminated to a cyclic olefin resin film being a base film even when the coat layer-laminated film is subjected to a bend test, and also prevent the coat layer-laminated film itself from curling while keeping favorable fracture elongation and excellent adhesion.

Solution to Problem

The present inventor has assumed that the object of the present invention can be achieved by forming a layer more flexible but better in abrasion resistance than conventional polyester films and polymethacrylate films as a protective coat layer to be laminated to cyclic olefin resin films in consideration that cyclic olefin resin films have characteristics of low flexibility and being easily scratched as compared to conventional films. Under this assumption, the present inventor has found that the above object can be achieved by laminating a photocured resin layer of a special-formulated photocurable composition as a protective coat layer to a cyclic olefin resin film, thereby completing the present invention. Herein the photocurable composition contains a multifunctional acrylate monomer, an isocyanuric acid derivative having two or more (meth)acryloxy groups, a caprolactone oligomer derivative having three or more (meth)acryloxy groups, and a photopolymerization initiator.

That is, the present invention provides a photocurable composition containing the following components (A), (C), (D), and (E):

Component (A), a multifunctional acrylate monomer;

Component (C), an isocyanuric acid derivative having two or more (meth)acryloxy groups;

Component (D), a caprolactone oligomer derivative having three or more (meth)acryloxy groups; and Component (E), a photopolymerization initiator. This photocurable composition is particularly useful as a protective coat layer-forming composition for forming a protective coat layer of a protective coat layer-laminated film including a base film made of a cyclic olefin resin and the protective coat layer formed on at least one side of the base film.

The present invention also provides a protective coat layer-laminated film including a base film made of a cyclic olefin resin and a protective coat layer formed on at least one side of the base film, wherein the protective coat layer is a photocured product layer of a photocurable composition containing components (A), (C), (D), and (E) described above. The present invention also provides a protective coat layer-laminated film for a touch panel, having a transparent electrode formed on at least one side of this protective coat layer-laminated film. The present invention further provides an image display and input device in which at least this protective coat layer-laminated film for a touch panel and an image display element are laminated to each other.

Advantageous Effects of Invention

The photocurable composition of the present invention contains a multifunctional acrylate monomer as the component (A), an isocyanuric acid derivative having two or more (meth)acryloxy groups as the component (C), a caprolactone oligomer derivative having three or more (meth)acryloxy groups as the component (D), and a photopolymerization initiator as the component (E). Thus, the protective coat layer-laminated film obtained by laminating a photocured product layer of this photocurable composition as a protective coat layer on a base film made of a cyclic olefin resin causes no practically problematic cracks not only on the outermost surface of the protective coat layer but also on the surface of the base film made of a cyclic olefin resin on the protective coat layer side even when the protective coat layer-laminated film is subjected to a 180 degree bend test using bars of about several millimeters in diameter with the protective coat layer facing outward. In addition, the protective coat layer-laminated film itself hardly curls while exhibiting favorable fracture elongation and excellent adhesion.

DESCRIPTION OF EMBODIMENTS

Figure 1:
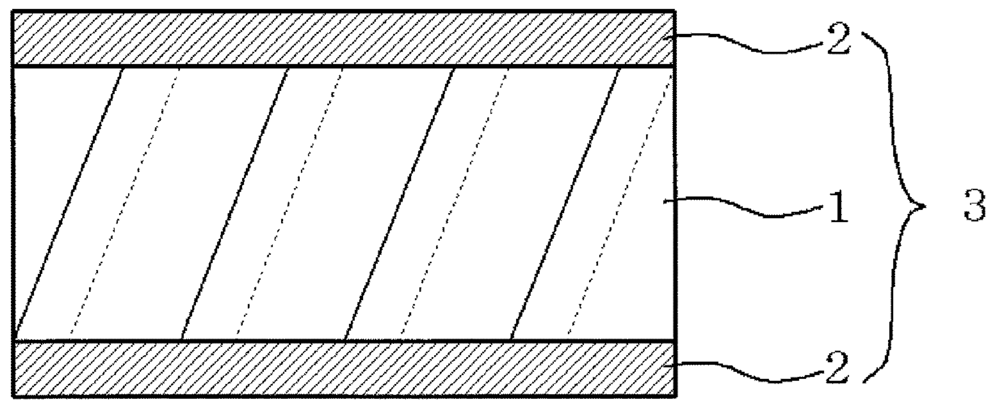
FIG. 1 is a cross-sectional view of a protective coat layer-laminated film of the present invention.

The photocurable composition of the present invention will be described below in detail.

The photocurable composition of the present invention is particularly useful as a protective coat layer-forming composition for forming a protective coat layer of a protective coat layer-laminated film including a base film made of a cyclic olefin resin and the protective coat layer formed on at least one side of the base film. The photocurable composition of the present invention contains the following components (A), (C), (D), and (E). Each component will be described below in detail.

<Component (A)>

The component (A) is a multifunctional acrylate monomer in order to improve the adhesion to the cyclic olefin resin and the reactivity of the photocurable composition itself. Such a multifunctional acrylate monomer is a polymerizable compound having two or more, preferably three or more acrylate residues or methacrylate residues (hereinafter, (meth)acrylate residues) in the molecule, and can be appropriately selected from multifunctional acrylate monomers used in the field of adhesives or other fields for use. Specific examples of the multifunctional acrylate monomer may include bisphenol F EO-modified di(meth)acrylate, bisphenol A EO-modified di(meth)acrylate, trimethylolpropane tri(meth)acrylate, polyethylene glycol di(meth)acrylate, polypropylene glycol di(meth)acrylate, dicyclopentenyl (meth) acrylate, dicyclopentenyloxyethyl (meth) acrylate, neopentyl glycol di(meth)acrylate, pentaerythritol tri(meth) acrylate, and dipentaerythritol hexa(meth)acrylate. Of these, pentaerythritol triacrylate can be preferably used from the viewpoints of adhesion, reactivity, crosslinkability, and surface hardness. Specific examples of commercially available products can include those identified as product name "M 305" by Toagosei Co., Ltd. and product name "TMM-3L" by Shin-Nakamura Chemical Co., Ltd.

A too low content of the component (A) in the photocurable composition tends to deteriorate the characteristics of adhesion, reactivity, crosslinkability, surface hardness, and the like, whereas a too high content tends to deteriorate the characteristics of bendability, curling, and the like. Therefore, the content of the component (A) in the photocurable composition is preferably 5 to 50% by mass, more preferably 5 to 40% by mass, and still more preferably 5 to 20% by mass.

<Component (B)>

The photocurable composition of the present invention may optionally contain a multifunctional acrylate oligomer as a component (B) to improve the surface hardness of the photocured product of the photocurable composition, in addition to the component (A) of the multifunctional acrylate monomer, unless the effects of the present invention are impaired. Examples of the multifunctional acrylate oligomer may include urethane acrylate oligomers and polyester acrylate oligomers. The molecular weight of the multifunctional acrylate oligomer is preferably 500 to 10000. Specific examples of commercially available products may include those identified as product name "UV 7605" by Nippon Synthetic Chemical Industry Co., Ltd., product names "M 1100," "M 1200," "M 1210," "M 1600," and "M 9050" by Toagosei Co., Ltd., and product names "AH-600" and "AT-600" by Kyoeisha Chemical Co., Ltd.

Since a too high content of the component (B) in the photocurable composition tends to deteriorate the characteristics of bendability, curling, and the like, the content of the component (B) is preferably configured not to exceed 40% by mass. The content of the component (B) is more preferably 10 to 30% by mass. When the component (B) is present, the total of the components (A) and (B) is preferably configured not to exceed 40% by mass.

<Component (C)>

The component (C) of an isocyanuric acid derivative having two or more (meth)acryloxy groups has an isocyanuric acid ring structure and is mixed to improve the heat resistance of the photocured product of the photocurable composition and prevent the photocured product from curling. Examples of the isocyanuric acid derivative may include bis((meth)acryloxyalkyl)-hydroxyalkyl isocyanurate and tris((meth)acryloxyalkyl)isocyanurate. Here, an isocyanuric acid derivative having two (meth)acryloxy groups can be preferably used because the cure shrinkage in the photocuring of the photocurable composition is smaller than that of isocyanuric acid derivatives having three or more (meth)acryloxy groups. Particularly preferably, bis(acryloxyethyl)-hydroxyethyl isocyanurate having two (meth) acryloxy groups can be used. Specific examples of commercially available products may include those identified as product names "M-215" and "M-315" by Toagosei Co., Ltd.

A too low content of the component (C) in the photocurable composition tends to deteriorate the characteristics of bendability, curling, adhesion, thermal resistance, and the like, whereas a too high content tends to deteriorate the characteristics of as crosslinkability, adhesion, and the like. Therefore, the content of the component (C) in the photocurable composition is preferably 5 to 40% by mass, and more preferably 10 to 30% by mass.

<Component (D)>

The component (D) of a caprolactone oligomer derivative having three or more (meth)acryloxy groups is mixed to give flexibility with favorable bendability, crack resistance, and the like to the photocured product of the photocurable composition. Of such caprolactone oligomer derivatives, one having nine (meth)acryloxy groups can be preferably used.

As the component (D) of a caprolactone oligomer derivative having three or more (meth)acryloxy groups, one exhibiting 30% to 50% fracture elongation (oligomer elongation) can be preferably used. The fracture elongation (oligomer elongation) as used herein refers to the elongation (%) at break obtained by the following procedure: applying a composition containing 100 parts by mass of a oligomer derivative and 3 parts by mass of 2-hydroxy-2-cyclohexyl acetophenone as a photopolymerization initiator so that a cured thickness of 60 to 100 μm is achieved; photocuring the composition under the conditions of 200 mW/cm$^2$ and 300 mJ/cm$^2$ to produce a oligomer-cured product; and evaluating the oligomer-cured product with a tension tester (product name: Tensilon, Orientec Co., Ltd.). When the oligomer contains a solvent, the solvent is optionally volatilized before or after photocuring, followed by measurement. Specific examples of commercially available products may include those identified as product names "UT 5236" and "UT 5237" by Nippon Synthetic Chemical Industry Co., Ltd., and product name "CN 929" by Arkema. Unless the effects of the invention are impaired, a caprolactone oligomer derivative having two (meth)acryloxy groups, for example, product name "CN UVE 151" by Arkema, product name "EB 8402" by Daicel-Cytec Co., Ltd., etc. may be used in combination with caprolactone oligomer derivatives having three or more (meth)acryloxy groups.

A too low content of the component (D) in the photocurable composition tends to deteriorate the characteristics of bendability, crack resistance curling, and the like, whereas a too high content tends to deteriorate the characteristics of surface hardness, adhesion, and the like. Therefore, the content of the component (D) in the photocurable composition is preferably 10 to 80% by mass, and more preferably 40 to 60% by mass.

<Component (E)>

The component (E) of a photopolymerization initiator can be appropriately selected from known photo-radical polymerization initiators for use. Examples of photopolymerization initiators may include acetophenone-based photopolymerization initiators, benzyl ketal-based photopolymerization initiators, and phosphorus-based photopolymerization initiators. Specific examples of acetophenone-based photopolymerization initiators may include 2-hydroxy-2-cyclohexylacetophenone (IRGACURE 184, BASF Japan), α-hydroxy-α,α'-dimethylacetophenone (DAROCUR 1173, BASF Japan), 2,2-dimethoxy-2-phenylacetophenone (IRGACURE 651, BASF Japan), 4-(2-hydroxyethoxy)phenyl(2-hydroxy-2-propyl)ketone (DAROCUR 2959, BASF Japan), and 2-hydroxy-1-{4-[2-hydroxy-2-methyl-propionyl]-benzyl}phenyl}-2-methyl-propan-1-one (IRGACURE 127, BASF Japan). Examples of benzyl ketal-based photopolymerization initiators may include benzophenone, fluorenone, dibenzosuberone, 4-aminobenzophenone, 4,4'-diaminobenzophenone, 4-hydroxybenzophenone, 4-chlorobenzophenone, and 4,4'-dichlorobenzophenone. Benzyl-2-dimethylamino-1-(4-morpholinophenyl)-butanone-1 (IRGACURE 369, BASF Japan) can be also used. Examples of phosphorus-based photopolymerization initiators may include bis(2,4,6-trimethylbenzoyl)-phenylphosphine oxide (IRGACURE 819, BASF Japan) and 2,4,6-trimethylbenzoyl-diphenylphosphine oxide (DAROCUR TPO, BASF Japan).

A too low content of the component (E) in the photocurable composition tends to cause decreased adhesion and insufficient hardness due to decreased hardness performance, whereas a too high content tends to decrease the characteristics of adhesion and the like due to defective polymerization. Therefore, the content of the component (E) in the photocurable composition is preferably 0.5 to 25% by mass, and more preferably 1 to 10% by mass.

The photocurable composition of the present invention may contain additives, such as a solvent, a leveling agent, a hue-adjusting agent, a colorant, a ultraviolet absorber, an antistatic agent, and various thermoplastic resin materials, unless the effects of the present invention are impaired. For the purpose of refractive index adjustment and intentional surface roughening, fine particles including an organic substance, an inorganic substance, and an organic-inorganic hybrid can be appropriately added.

As the antistatic agent, for example, conductive carbon, inorganic fine particles, inorganic powder, surfactants, and ionic liquids can be used. These antistatic agents may be used singly or in any combination thereof. Examples of materials for inorganic fine particles and inorganic powder may include materials containing a conductive metallic oxide as a main component. As the conductive metallic oxide, for example, tin oxide, indium oxide, antimony-doped tin oxide (ATO), indium-doped tin oxide (ITO), and antimony zinc oxide can be used.

The photocurable composition of the present invention can be produced by uniformly mixing the components (A), (C), (D), (E) described above, further (B), and various additives according to an ordinary method.

The photocurable composition of the present invention described above is particularly useful as a protective coat layer-forming composition for forming a protective coat layer of a protective coat layer-laminated film including a base film made of a cyclic olefin resin and the protective coat layer formed on at least one side of the base film as already described.

Examples of the cyclic olefin resin here may include resins (COP) having an alicyclic structure in a main chain with cycloolefin as a monomer and obtained by the ring-opening metathesis polymerization of cyclic olefin (for example, norbornenes) and the subsequent hydrogenation reaction, and resins (COC) obtained by the addition polymerization of cyclic olefin (for example, norbornenes) and α-olefin (for example, ethylene).

Specific examples of COP may include polytetracyclododecene specified as product name "ZEONOR" by Zeon Corporation. Specific examples of COC may include ethylene norbornene copolymer specified as product name "TOPAS" by TOPAS Advanced Polymers, ethylene tetracyclododecene copolymer specified as product name "APEL" by Mitsui Chemicals, Inc., and ethylene tetracyclododecene methacrylate copolymer specified as product name "ARTON" by JSR, Inc. The phase difference function may be imparted to the film including these cyclic olefin resins by a known procedure.

Therefore, in taking advantage of the photocurable composition of the present invention, the present invention also encompasses a protective coat layer-laminated film including a base film made of a cyclic olefin resin and a protective coat layer formed on at least one side of the base film wherein the protective coat layer is a photocured product layer of the photocurable composition of the present invention.

FIG. 1 illustrates the cross-sectional view of such a protective coat layer-laminated film 3. The protective coat layer-laminated film 3 has a structure where protective coat layers 2 are laminated to both sides of a base film 1. Although not illustrated, the protective coat layer 2 may be laminated to only one side of the base film 1. The material for the base film 1 and the photocurable composition for forming the protective coat layer 2 are as described above.

The thickness of the base film 1, depending on the type and performance of an optical device to which the base film 1 is applied, is usually 25 to 200 μm, and preferably 40 to 150 μm. The thickness of the protective coat layer 2 is usually 0.5 to 8 μm, and preferably 0.8 to 7 μm.

The application method and photocuring conditions of the photocurable composition in the production of the protective coat layer-laminated film 3 can be appropriately selected from known procedures and conditions depending on the formulation of the photocurable composition used or the like. An exemplary method for producing the protective coat layer-laminated film (coating material preparation→base film pretreatment→application→drying/curing) will be described below.

(Coating Material Preparation)

First, the components (A), (C), (D), (E) described above, further optionally the component (B) and other various additives such as a solvent, a leveling agent, a ultraviolet absorber, an antistatic agent, a fire retardant, an antioxidant, and a silica particle-viscosity modifier are uniformly mixed using a mixer, such as Disper, according to an ordinary method to prepare a coating material of the photocurable composition. It is preferable that this photocurable composition not only have translucency but also avoid significant changes in the hue of transmitted light and the amount of transmitted light due to coloring and haze.

There is no particular lamination on the solvent, and any known organic solvents can be used so long as, for example, they dissolve well resin raw materials used. Examples of organic solvents may include ketone solvents, such as MEK, MIBK, and ANON; alcohol solvents, such as IPA, n-BuOH, and t-BuOH; ester solvents, such as butyl acetate and ethyl acetate; and glycol ether solvents.

(Base Film Pretreatment)

Next, a surface treatment is preferably performed on one side or both sides of the base film by an oxidation method or a surface roughening method in order to improve the adhesion of the base film to the cured product layer of the photocurable composition. Examples of the oxidation method may include corona discharge treatment, glow discharge treatment, chromic acid treatment (wet type), flame treatment, hot air treatment, and ozone/ultraviolet irradiation treatment.

(Application)

Next, the coating material obtained as described above is applied to the base film. There is no particular limitation imposed on the application method and any known application methods can be used. Examples of known application methods may include a microgravure coating method, a wire bar coating method, a direct gravure coating method, a die coating method, a dipping method, a spray coating method, a reverse roll coating method, a curtain coating method, a comma coating method, a knife coating method, and a spin coating method.

(Drying/Curing)

Next, the coating material applied to the base film is dried and cured to form a cured product layer (i.e., protective coat layer) of the photocurable composition. This procedure provides a protective coat layer-laminated film of the present invention.

There is no particular limitation imposed on the drying conditions, and the coating material may be dried by natural drying, or by artificial drying in which the drying temperature, drying time, and the like are controlled. It is noted that wind ripples are preferably avoided on the coating surface when the coating surface is dried by air. This is because wind ripples cause deteriorated coating appearance and uneven surface thickness.

Light used for curing the photocurable composition includes energy rays, such as ultraviolet rays as well as gamma rays, alpha rays, and electron rays. In such cases, the photopolymerization initiator according to the energy ray used may be employed.

Such a protective coat layer-laminated film can be preferably used as a protective coat layer-laminated film for a touch panel by forming an ITO film or a transparent electrode including conductive fine particles or nanowire-shaped materials on at least one side of the protective coat layer-laminated film according to a known procedure. In addition, the laminate of such a protective coat layer-laminated film for a touch panel and an image display element, such as a liquid crystal display element or an organic EL display element, is preferably used as an image display and input device for a smart phone or a personal computer.

Figure 2:
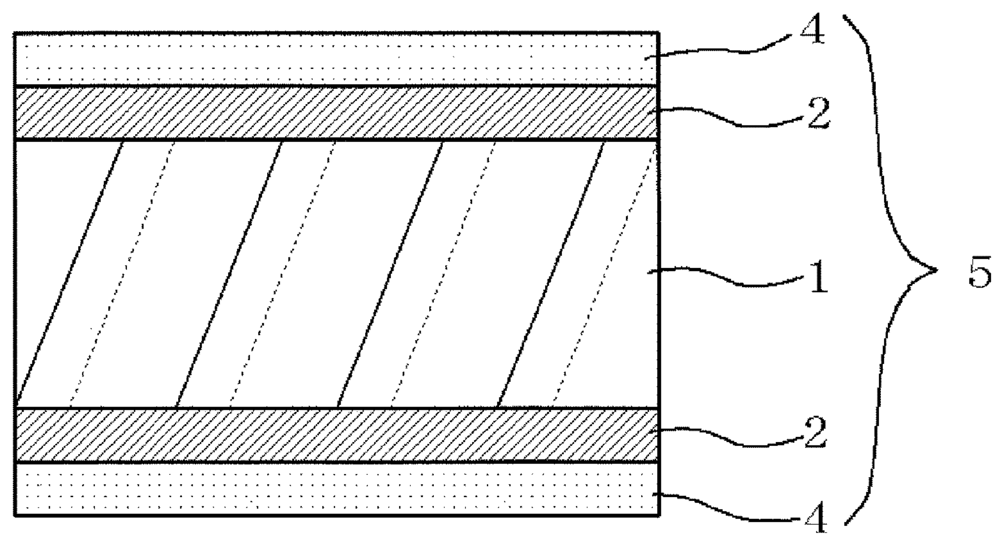
FIG. 2 is a cross-sectional view of a protective coat layer-laminated film for a touch panel of the present invention.
Figure 3:
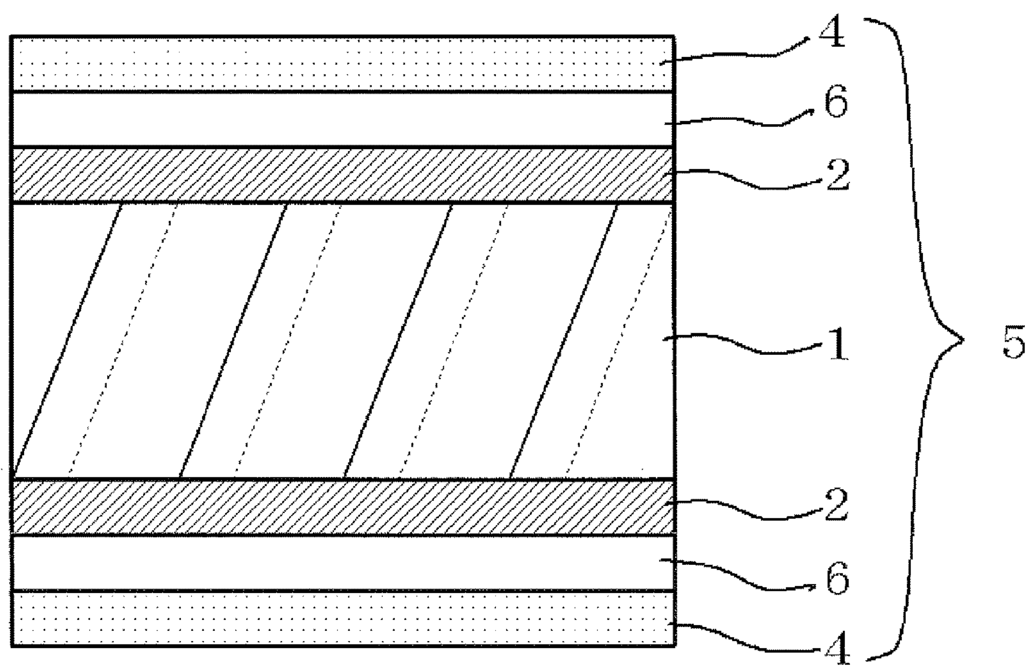
FIG. 3 is a cross-sectional view of a protective coat layer-laminated film for a touch panel of the present invention.

FIGS. 2 and 3 illustrate the cross-sectional views of exemplary protective coat layer-laminated films 5 for a touch panel. In FIG. 2, protective coat layers 2 are formed on respective sides of the base film 1, and known transparent electrodes 4, such as ITO, are further formed on the respective surfaces of the protective coat layers 2. In FIG. 3, an optical adjustment layer 6, such as a known phase difference film, is formed between the protective coat layer 2 and the transparent electrode 4. These protective coat layer-laminated films 5 for a touch panel can be produced according to the method for producing a protective coat layer-laminated film 3 described above.

EXAMPLES

The present invention will be specifically described below by way of Examples.

Examples 1 to 21, Comparative Examples 1 to 13

Photocurable compositions were prepared by uniformly mixing the components at the proportions (unit=% by mass) described in Table 1, and protective coat layer-laminated films were produced as describe below.

(Production of Protective Coat Layer-Laminated Film)

The obtained photocurable compositions were applied to both sides of a cyclic olefin resin film (ZEONOR, Zeon Corporation) treated with corona treatment and having a thickness of 100 μm or 50 μm as a base film so that the thickness of each of the protective coat layers formed on the respective sides after photocuring is as described in Table 1. The photocurable compositions were photocured under the irradiation conditions of 200 $mW/cm^2$ and 300 $mJ/cm^2$ to form protective coat layers, thereby providing protective coat layer-laminated films with the layer structure illustrated in FIG. 1.

The obtained protective coat layer-laminated films were tested and evaluated for "bend test," "Martens hardness," "fracture elongation," "curling property," "abrasion resistance," and "adhesion" as describe below. The obtained results are described in Table 1.

Protective coat layer-laminated films having the same structure as in FIG. 1 were produced using the photocurable compositions containing the components (A) to (D) constituting the composition and a photopolymerization initiator, and the fracture elongation was measured in the same manner and defined as the oligomer elongation of the components.

<Bend Test>

Figure 4:
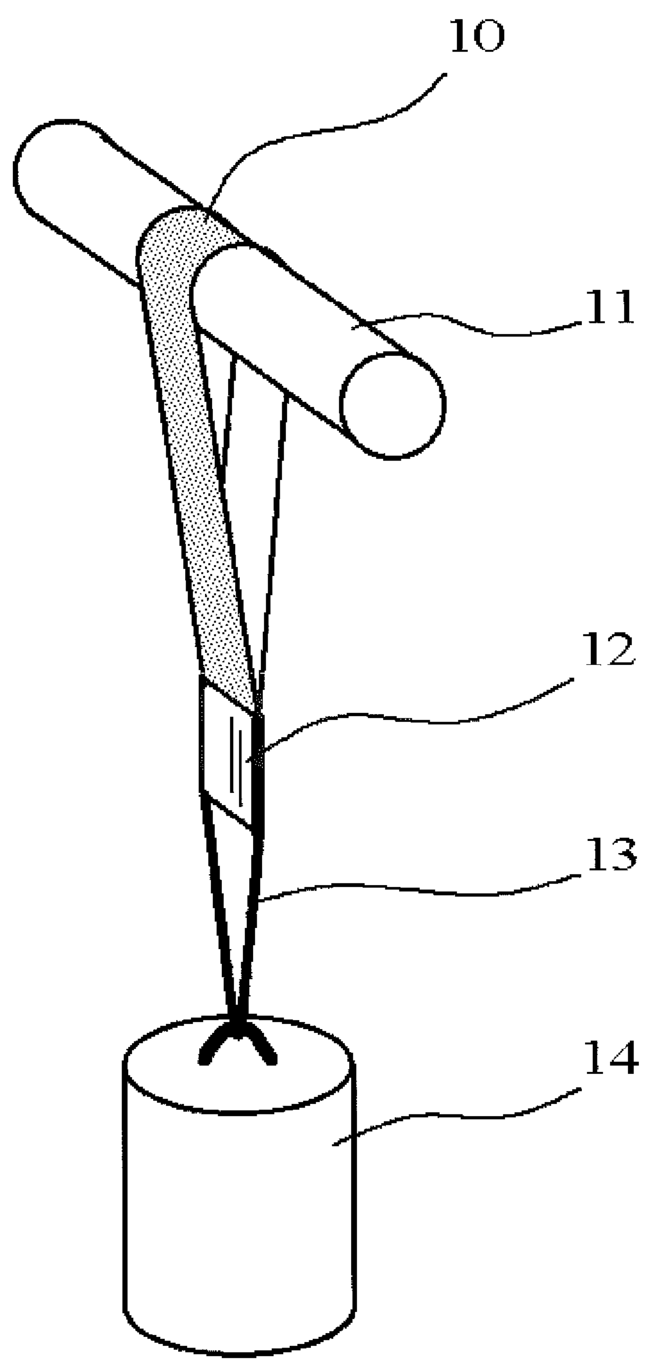
FIG. 4 is an explanatory diagram for the bend test.

As illustrated in FIG. 4, a protective coat layer-laminated film (100 mm×20 mm) 10 was bent 180 degrees by longitudinally hanging it over stainless round bar 11 with the protective coat layer facing outward. The both ends of the film were bonded together with an adhesive tape 12 to form a loop. A clip 13 was suspended from the bonding part, and the end of the clip 13 was provided with a 300-g weight 14 (load). This state was held for 10 seconds. The weight was then removed, and the protective coat layer-laminated film was observed through an optical microscope at 10-times magnification to determine whether cracks occurred on the surface of the protective coat layer or the surface of the base film on the protective coat layer side around the round bar 11. The diameter of the round bar when cracks occurred are described in Table 1. The "p" after the value of the diameter indicates that cracks occurred on the surface of the protective coat layer; and the "b" indicates that cracks occurred on the surface of the base film on the protective coat layer side.

It is noted that a smaller value of the diameter indicates that it is more difficult to generate cracks in bending.

The similar tests were carried out using round bars with different diameters. The diameter of the round bar at the brake of the protective coat layer-laminated film are described in Table 1.

<Martens Hardness>

A protective coat layer-laminated film (30 mm×70 mm) was fixed to a slide glass using Aron Alpha produced by Toagosei Co., Ltd. and the like so that the opposite side of a measuring surface faces the slide glass, and completely cured for use. The surface hardness was measured at an arbitrarily selected point with a Vickers indenter so that the maximum indentation depth is equal to or less than 10% of the average thickness of the protective coat layer. In order to minimize the influence of the adhesive layer for fixation, the adhesive layer is preferably formed as thin as possible. The measurement was performed with a Martens hardness meter (HM500, Fischer Instruments K.K.). The obtained results are described in Table 1. The Martens hardness of the protective coat layer is desirably 150 N/mm$^2$ or more for practical use.

<Fracture Elongation>

A protective coat layer-laminated film (70 mm×20 mm) was stretched at a rate of 0.5 mm/min using a tension tester (product name: Tensilon, Orientec Co., Ltd.) to determine the elongation percentage at fracture (break) of the samples. The obtained results are described in Table 1. The fracture elongation of the protective coat layer-laminated film is desirably from 8% to 30% for practical use.

<Curling Property>

A protective coat layer-laminated film (100 mm×100 mm) is placed on a flat metal plate with the protective coat layer facing upward. The heights of the lifted four corners of the film from the metal plate were measured to obtain the mean value (curl value) thereof. The curl value of less than 5 mm was rated as good "A," the curl value of 5 mm or more and less than 10 mm was rated as fair "B," and the curl value of 10 mm or more was rated as poor "C." The obtained results are described in Table 1.

<Abrasion Resistance>

A protective coat layer-laminated film (100 mm×50 mm) is placed in a scratch tester (product name: Color fastness rubbing tester, Tester Sangyo Co., Ltd.) with the protective coat layer facing upward. A scratch test was performed on the surface of the protective coat layer by scratching 20 times (10 reciprocations) using steel wool of #0000 with a load of 250 g. The presence of scratches was visually observed. The case of no scratch observed was rated as good "A," the case of one to ten scratches observed was rated as fair "B," and the case of countless scratches observed over the surface was rated as poor "C." The obtained results are described in Table 1.

<Adhesion (JIS K5400)>

The protective coat layer of a protective coat layer-laminated film (50 mm×50 mm) was given linear cuts with a cutter to form 100 grid squares. An adhesive tape (Cellophane tape, Nichiban Co., Ltd.) was stuck to the grid spaces. After peeling the adhesive tape, the number of the grid squares left on the protective coat layer-laminated film without being transferred to the adhesive tape was counted. The case of 100 grid squares was rated as good "A," the case of less than 100 and 30 or more of grid squares was rated as fair "B," and the case of less than 30 grid squares was rated as poor "C." The obtained results are described in Table 1.

TABLE 1

| Compo-nents | Class | Name | Product Name | Number of Functional Groups | Oligomer Elongation (%) | Examples 1 | 2 | 3 | 4 | 5 | 6 | 7 | 8 |
|---|---|---|---|---|---|---|---|---|---|---|---|---|---|
| (A) | Multifunctional Acrylic Monomer | Penta erythritol Triacrylate | M305 | 3 | 0.6 | 9.7 | 9.8 | 9.6 | 9.5 | 9.7 | 9.7 | 9.7 | 9.7 |
| (B) | Multifunctional Acrylic Oligomer | Urethane Acrylic Oligomer | UV7605 | 6 | 0.8 | | | | | | | | |
| (C) | Isocyanuric Acid Derivatives | Bifunctional Isocyanuric Acid Acrylate | M215 | 2 | 2.4 | 29 | 29 | 29 | 29 | 39 | 49 | 29 | 29 |
| | | Trifunctional Isocyanuric Acid Acrylate | M315 | 3 | 0.8 | | | | | | | | |
| (D) | Caprolactone Oligomer Derivatives | | UT5236 | 9 | 35 | 58 | 59 | 58 | 57.0 | 49 | 39 | | 58 |
| | | | UT5237 | 9 | 9 | | | | | | | 58 | |
| | | | CN929 | 3 | 61 | | | | | | | | |
| | | | EB8402 | 2 | 115 | | | | | | | | |
| | | | CNUVE151 | 2 | 40 | | | | | | | | |
| | Caprolactone Monomer | | SR495 | — | — | | | | | | | | |
| | Photopolymerization Initiator | | IRGACURE 184 | — | — | 3.0 | 2.0 | 4.0 | 5.0 | 3.0 | 3.0 | 3.0 | 3.0 |
| Evaluation Results | | Thickess of Base Film (μm) | | | | 100 | 100 | 100 | 100 | 100 | 100 | 100 | 100 |
| | | Thickness of Protective Coat Layer (μm) | | | | 3 | 3 | 3 | 3 | 3 | 3 | 3 | 7 |
| | Bend Test | Diameter of Round Bar at Crack Occurrence (μm) | | | | 3.0b | 3.0b | 3.0b | 3.0b | 3.3b | 3.7p | 3.7p | 3.0b |
| | | Diameter of Round Bar at Break (μm) | | | | 0.8 | 0.8 | 0.8 | 0.8 | 1.1 | 1.3 | 1.3 | 0.8 |
| | | Martens Hardness (N/mm2) | | | | 160 | 154 | 159 | 159 | 180 | 194 | 185 | 156 |
| | | Fracture Elongation (%) | | | | 20 | 20 | 20 | 20 | 15 | 13 | 32 | 20 |
| | | Curl Property | | | | A | A | A | A | A | A | A | A |
| | | Abrasion Resistance | | | | A | B | A | A | A | A | A | A |
| | | Adhesion | | | | A | A | A | B | A | A | A | A |

| Compo-nents | Class | Name | Product Name | Number of Functional Groups | Oligomer Elongation (%) | Examples 9 | 10 | 11 | 12 | 13 | 14 | 15 | 16 |
|---|---|---|---|---|---|---|---|---|---|---|---|---|---|
| (A) | Multifunctional Acrylic Monomer | Penta-erythritol Triacrylate | M305 | 3 | 0.6 | 9.7 | 9.7 | 9.7 | 9.7 | 9.7 | 9.7 | 9.7 | 9.7 |
| (B) | Multifunctional Acrylic Oligomer | Urethane Acrylic Oligomer | UV7605 | 6 | 0.8 | | | 39 | 29 | 19 | | 19 | 39 |
| (C) | Isocyanuric Acid Derivatives | Bifunctional Isocyanuric Acid Acrylate | M215 | 2 | 2.4 | 29 | 29 | 29 | 29 | 29 | 29 | 29 | 29 |

TABLE 1-continued

| | | | | | | | | | | | | | |
|---|---|---|---|---|---|---|---|---|---|---|---|---|---|
| | | Trifunctional Isocyanuric Acid Acrylate | M315 | 3 | 0.8 | | | | | | | | |
| (D) | Caprolactone Oligomer Derivatives | | UT5236 | 9 | 35 | 58 | 58 | 19 | 29 | 39 | | | |
| | | | UT5237 | 9 | 9 | | | | | | | | |
| | | | CN929 | 3 | 61 | | | | | | 58 | 39 | 19 |
| | | | EB8402 | 2 | 115 | | | | | | | | |
| | | | CNUVE151 | 2 | 40 | | | | | | | | |
| | Caprolactone Monomer | | SR495 | — | — | | | | | | | | |
| | Photopolymerization Initiator | | IRGACURE 184 | — | — | 3.0 | 3.0 | 3.0 | 3.0 | 3.0 | 3.0 | 3.0 | 3.0 |
| Evaluation Results | Thickess of Base Film (μm) | | | | | 100 | 100 | 100 | 100 | 100 | 100 | 100 | 100 |
| | Thickness of Protective Coat Layer (μm) | | | | | 5 | 1 | 3 | 3 | 3 | 3 | 3 | 3 |
| | Bend Test | Diameter of Round Bar at Crack Occurrence (μm) | | | | 3.0b | 3.0b | 3.5p | 3.5p | 3.3b | 3.0b | 3.0b | 3.0b |
| | | Diameter of Round Bar at Break (μm) | | | | 0.8 | 03 | 2.0 | 2.0 | 1.3 | 0.8 | 0.8 | 3.0 |
| | Martens Hardness (N/mm2) | | | | | 156 | 160 | 206 | 194 | 182 | 84 | 149 | 191 |
| | Fracture Elongation (%) | | | | | 20 | 20 | 5 | 7 | 10 | 32 | 20 | 7 |
| | Curl Property | | | | | A | A | A | A | A | A | A | A |
| | Abrasion Resistance | | | | | A | A | A | A | A | B | A | A |
| | Adhesion | | | | | A | A | A | A | A | A | A | B |

| Compo- | | | Product | Number of Functional | Oligomer Elongation | Comparative Example | | | | | | | | |
|---|---|---|---|---|---|---|---|---|---|---|---|---|---|---|
| nents | Class | Name | Name | Groups | (%) | 1 | 2 | 3 | 4 | 5 | 6 | 7 | 8 | 9 |
| (A) | Multifunctional Acrylic Monomer | Pentaerythritol Triacrylate | M305 | 3 | 0.6 | 9.7 | 9.7 | 9.7 | 9.7 | 9.7 | 9.7 | 9.7 | 15 | 39 |
| (B) | Multifunctional Acrylic Oligomer | Urethane Acrylic Oligomer | UV7605 | 6 | 0.8 | | 19 | 39 | | 19 | 39 | 58 | 39 | 58 |
| (C) | Isocyanuric Acid Derivatives | Bifunctional Isocyanuric Acid Acrylate | M215 | 2 | 2.4 | 29 | 29 | 29 | 29 | 29 | 29 | 29 | 44 | |
| | | Trifunctional Isocyanuric Acid Acrylate | M315 | 3 | 0.8 | | | | | | | | | |
| (D) | Caprolactone Oligomer Derivatives | | UT5236 | 9 | 35 | | | | | | | | | |
| | | | UT5237 | 9 | 9 | | | | | | | | | |
| | | | CN929 | 3 | 61 | | | | | | | | | |
| | | | EB8402 | 2 | 115 | 58 | 39 | 19 | | | | | | |
| | | | CNUVE151 | 2 | 40 | | | | 58 | 39 | 19 | | | |
| | Caprolactone Monomer | | SR495 | — | — | | | | | | | | | |
| | Photopolymerization Initiator | | IRGACURE 184 | — | — | 3.0 | 3.0 | 3.0 | 3.0 | 3.0 | 3.0 | 3.0 | 3.0 | 3.0 |
| Evaluation Results | Thickess of Base Film (μm) | | | | | 100 | 100 | 100 | 100 | 100 | 100 | 100 | 100 | 100 |
| | Thickness of Protective Coat Layer (μm) | | | | | 3 | 3 | 3 | 3 | 3 | 3 | 3 | 3 | 3 |
| | Bend Test | Diameter of Round Bar at Crack Occurrence (μm) | | | | 3.0b | 3.0b | 4.0p | 3.7p | 3.0b | 4.0p | 5.0p | 5.0p | 8.0p |
| | | Diameter of Round Bar at Break (μm) | | | | 0.8 | 0.8 | 3.0 | 0.8 | 0.8 | 27 | 3.0 | 3.0 | 3.0 |
| | Martens Hardness (N/mm2) | | | | | 102 | 154 | 202 | 102 | 173 | 202 | 240 | 240 | 280 |

TABLE 1-continued

| | | | | | | | | | |
|---|---|---|---|---|---|---|---|---|---|
| Fracture Elongation (%) | 35 | 20 | 7 | 32 | 18 | 7 | 1.70 | 0.90 | 0.80 |
| Curl Property | A | A | A | A | A | A | C | C | C |
| Abrasion Resistance | C | C | A | C | C | A | A | A | A |
| Adhesion | A | C | C | A | C | C | A | A | A |

| Compo-<br>nents | Class | Name | Product<br>Name | Number of Functional<br>Groups | Oligomer Elongation<br>(%) | Comparative Example<br>10 | <br>11 | <br>12 | Exam-ple<br>17 | Comp. Ex.<br>13 | Example<br>18 | <br>19 | <br>20 | <br>21 |
|---|---|---|---|---|---|---|---|---|---|---|---|---|---|---|
| (A) | Multifunction-al Acrylic Monomer | Penta-erythritol Triacrylate | M305 | 3 | 0.6 | 58 | 9.7 | 9.7 | 9.7 | 9.7 | 9.7 | 9.7 | 9.7 | 9.7 |
| (B) | Multifunction-al Acrylic Oligomer | Urethane Acrylic Oligomer | UV7605 | 6 | 0.8 | 39 | 30 | 49 | 19 | 29 | | | | |
| (C) | Isocyanuric Acid Derivatives | Bifunctional Isocyanuric Acid Acrylate | M215 | 2 | 2.4 | | | | 10.0 | | 50.0 | 15.0 | 29 | 29.1 |
| | | Trifunctional Isocyanuric Acid Acrylate | M315 | 3 | 0.8 | | | | | | | 1.4 | | |
| (D) | Caprolactone Oligomer Derivatives | | UT5236 | 9 | 35 | | 57.0 | 38.0 | 53.0 | 58.0 | 37 | 582 | 30.0 | 582 |
| | | | UT5237 | 9 | 9 | | | | | | | | | |
| | | | CN929 | 3 | 61 | | | | | | | | | |
| | | | EB8402 | 2 | 115 | | | | | | | | | |
| | | | CNUVE151 | 2 | 40 | | | | | | | | 28 | |
| | Caprolactone Monomer | | SR495 | — | — | | | | | | | | | |
| | Photopolymerization Initiator | | IRGACURE 184 | — | — | 3.0 | 3.0 | 3.0 | 3.0 | 3.0 | 3.0 | 3.0 | 3.0 | 3.0 |
| Evalu-ation Results | | Thickess of Base Film (μm) | | | | 100 | 100 | 100 | 100 | 100 | 100 | 100 | 100 | 50 |
| | | Thickness of Protective Coat Layer (μm) | | | | 3 | 3 | 3 | 3 | 3 | 3 | 3 | 3 | 3 |
| | Bend Test | Diameter of Round Bar at Crack Occurrence (μm) | | | | 8.0p | 3.0b | 3.0b | 3.0b | 3.0b | 3.0b | 3.0b | 3.0b | 1.5b |
| | | Diameter of Round Bar at Break (μm) | | | | 3.0 | 0.8 | 2 | 0.8 | 2 | 2 | 1.3 | 0.8 | ≤0.5 |
| | | Martens Hardness (N/mm2) | | | | 280 | 160 | 200 | 160 | 180 | 180 | 180 | 180 | 160 |
| | | Fracture Elongation (%) | | | | 0.80 | 5 | 5 | 15 | 15 | 15 | 15 | 25 | 20 |
| | | Curl Property | | | | C | C | C | A | C | A | A | A | A |
| | | Abrasion Resistance | | | | A | A | A | A | A | A | A | A | A |
| | | Adhesion | | | | A | A | A | A | C | B | A | A | A |

(Discussion)

The results of Table 1 indicate the followings.

(1) The protective coat layer-laminated films of Examples 1 to 21, which had the protective coat layer formed on the base film made of a cyclic olefin resin film, exhibited favorable characteristics practically acceptable for all evaluation items.

(2) The protective coat layer-laminated films of Comparative Examples 1 and 4 were rated as poor "C" in the abrasion resistance evaluation because the bifunctional caprolactone oligomer derivative was used as the component (D) at about 60% by mass.

(3) The protective coat layer-laminated films of Comparative Examples 2 and 5 were rated as poor "C" in the evaluation of not only abrasion resistance but also adhesion because the bifunctional caprolactone oligomer derivative was used as the component (D) at about 40% by mass.

(4) The protective coat layer-laminated films of Comparative Examples 3 and 6 were rated as poor "C" in the adhesion evaluation because the bifunctional caprolactone oligomer derivative was used as the component (D) at about 20% by mass.

(5) The protective coat layer-laminated films of Comparative Examples 7 to 10 were rated as poor "C" in the curl property evaluation because the component (D) was not used.

(6) The protective coat layer-laminated films of Comparative Examples 9 to 12 were rated as poor "C" in the curl property evaluation because the component (C) was not used.

(7) The protective coat layer-laminated film of Comparative Example 13 was rated as poor "C" in the curl property evaluation and further rated as poor "C" in the adhesion evaluation because the component (C) was not used.

INDUSTRIAL APPLICABILITY

The protective coat layer-laminated film obtained by laminating a photocured product layer of the photocurable composition of the present invention as a protective coat layer on a base film made of a cyclic olefin resin causes no practically problematic cracks not only on the outermost surface of the protective coat layer but also on the surface of the base film made of a cyclic olefin resin on the protective coat layer side even when the protective coat layer-laminated film is subjected to a 180 degree bend test using bars of about several millimeters in diameter with the protective coat layer facing outward. In addition, the protective coat layer-laminated film itself hardly curls to exhibit favorable adhesion.

Therefore, the photocurable composition of the present invention is useful for forming the protective coat layer of the protective coat layer-laminated film.

REFERENCE SIGNS LIST

1 base film
2 protective coat layer
3, 10 protective coat layer-laminated film
4 transparent electrode
5 protective coat layer-laminated film for touch panel
6 optical adjustment layer
11 round bar
12 adhesive tape
13 clip
14 weight

The invention claimed is:

1. A photocurable composition comprising the following components (A), (B), (C), (D), and (E):

Component (A), a multifunctional acrylate monomer comprising at least one selected from the group consisting of bisphenol F EO-modified di(meth)acrylate, bisphenol A EO-modified di(meth)acrylate, trimethylolpropane tri(meth)acrylate, dicyclopentenyl (meth) acrylate, dicyclopentenyloxyethyl (meth)acrylate, neopentyl glycol di(meth)acrylate, pentaerythritol tri (meth)acrylate, and dipentaerythritol hexa(meth) acrylate, wherein a content of the component (A) is 5 to 30% by mass;

Component (B), a multifunctional acrylate oligomer having a molecular weight of from 500 to 10,000 selected from the group consisting of a urethane(meth)acrylate having at least six (meth)acryloyl groups, a difunctional urethane acrylate, a multifunctional polyester acrylate, a phenylglycidylether acrylate hexamethylene diisocyanate urethane, and a phenylglycidylether acrylate toluene diisocyanate urethane, wherein a content of the component (B) is 10 to 30% by mass, and a total content of the components (A) and (B) is 40% by mass or lower;

Component (C), an isocyanuric acid derivative having two or more (meth)acryloxy groups, wherein a content of the component (C) is 5 to 40% by mass;

Component (D), a caprolactone oligomer derivative having three or more (meth)acryloxy groups, wherein a content of the component (D) is 37 to 79% by mass, and the component (B) is not the same as the component (D); and Component (E), a photopolymerization initiator, wherein a content of the component (E) is 1 to 10% by mass.

2. A protective coat layer-laminated film comprising a base film made of a cyclic olefin resin and a protective coat layer formed on at least one side of the base film, wherein the protective coat layer is a photocured product layer of the photocurable composition according to claim 1.

3. The protective coat layer-laminated film according to claim 2, wherein the base film has a thickness of 25 to 200 μm and the protective coat layer has a thickness of 0.5 to 8 μm.

4. A protective coat layer-laminated film for a touch panel, having a transparent electrode formed on at least one side of the protective coat layer-laminated film according to claim 2.

5. An image display and input device in which an image display element and at least the protective coat layer-laminated film for a touch panel according to claim 4 are laminated to each other.

6. The photocurable composition according to claim 1, wherein a content of the component (A) is 9.5 to 30% by mass.

7. The photocurable composition according to claim 1, wherein a total content of the components (C) and (D) is 86% by mass or greater.

* * * * *